(12) United States Patent
Schreter

(10) Patent No.: US 9,165,050 B2
(45) Date of Patent: Oct. 20, 2015

(54) DATA AVAILABILITY DURING COLUMNAR TABLE MERGES

(71) Applicant: Ivan Schreter, Malsch (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 173 days.

(21) Appl. No.: 13/946,303

(22) Filed: Jul. 19, 2013

(65) Prior Publication Data

US 2015/0026131 A1      Jan. 22, 2015

(51) Int. Cl.
*G06F 17/30*      (2006.01)

(52) U.S. Cl.
CPC .... *G06F 17/30595* (2013.01); *G06F 17/30356* (2013.01)

(58) Field of Classification Search
CPC .................. G06F 17/30286; G06F 17/30392; G06F 17/30554; G06F 17/30587; G06F 21/6245; G06F 17/30592; G06F 17/30; G06F 17/30315; G06F 17/30575; G06F 17/30312; G06F 17/30321; G06F 17/30345; G06F 17/3048; G06F 17/30303
USPC ......... 707/825, 674, 693, 703, 743, 803, 813, 707/609, 682, 705, 602, 644, 718, E17.001, 707/E17.044, E17.007, E17.002, E17.032, 707/E17.005, E17.017
See application file for complete search history.

(56) References Cited

U.S. PATENT DOCUMENTS

| | | | |
|---|---|---|---|
| 4,959,774 A | 9/1990 | Davis | |
| 5,819,306 A | 10/1998 | Goldman et al. | |
| 6,363,387 B1 | 3/2002 | Ponnekanti et al. | |
| 6,901,414 B2 * | 5/2005 | West et al. | 707/E17.005 |
| 7,155,427 B1 * | 12/2006 | Prothia et al. | 707/694 |
| 7,574,424 B2 | 8/2009 | Chowdhuri | |
| 7,783,610 B2 | 8/2010 | Lin et al. | |
| 7,937,384 B2 | 5/2011 | Minder et al. | |
| 8,032,499 B2 * | 10/2011 | Faerber et al. | 707/693 |
| 8,073,843 B2 * | 12/2011 | Chandrasekar et al. | 707/718 |
| 8,326,810 B2 * | 12/2012 | Faerber et al. | 707/693 |
| 2002/0065799 A1 * | 5/2002 | West et al. | 707/1 |
| 2003/0130985 A1 | 7/2003 | Driesen et al. | |
| 2005/0149584 A1 * | 7/2005 | Bourbonnais et al. | 707/204 |
| 2008/0059492 A1 * | 3/2008 | Tarin | 707/100 |
| 2009/0240663 A1 * | 9/2009 | Plattner et al. | 707/3 |
| 2010/0235335 A1 * | 9/2010 | Heman et al. | 707/703 |
| 2011/0016157 A1 * | 1/2011 | Bear et al. | 707/804 |
| 2011/0029569 A1 | 2/2011 | Ganesh et al. | |
| 2011/0137875 A1 | 6/2011 | Ziauddin et al. | |
| 2011/0161387 A1 * | 6/2011 | Krueger et al. | 707/825 |
| 2012/0036165 A1 * | 2/2012 | Driesen et al. | 707/803 |
| 2012/0047126 A1 * | 2/2012 | Branscome et al. | 707/714 |

(Continued)

OTHER PUBLICATIONS

Hasso Plattner, Alexander Zeier—"Organizing and Accessing Data in SanssouciDB"—In-Memory Data Management—Date: Apr. 17, 2012—pp. 97-164.*

(Continued)

*Primary Examiner* — Anh Ly
(74) *Attorney, Agent, or Firm* — Mintz Levin Cohn Ferris Glovsky and Popeo, P.C.

(57) ABSTRACT

Improved availability of data in columnar tables can be provided via use of additional data structures, such as for example a second delta part, a shadow second delta part, and a second main part, that are employed during a merge operation of a first delta part into a main part. Related apparatus, systems, techniques and articles are also described.

19 Claims, 5 Drawing Sheets

(56) References Cited

U.S. PATENT DOCUMENTS

| | | |
|---|---|---|
| 2012/0084278 A1* | 4/2012 | Franke et al. ............. 707/719 |
| 2012/0115190 A1* | 5/2012 | Coursey et al. .......... 435/91.2 |
| 2012/0221528 A1* | 8/2012 | Renkes et al. ............ 707/674 |
| 2012/0265728 A1* | 10/2012 | Plattner et al. ........... 707/607 |
| 2013/0024645 A1* | 1/2013 | Cheriton et al. .......... 711/206 |
| 2013/0054532 A1 | 2/2013 | Schreter |
| 2013/0117221 A1 | 5/2013 | Thomsen et al. |
| 2013/0117247 A1 | 5/2013 | Schreter et al. |
| 2013/0117528 A1 | 5/2013 | Thomsen et al. |
| 2013/0159258 A1* | 6/2013 | Belisle et al. ............ 707/654 |

OTHER PUBLICATIONS

Sándor Héman et al.—"Positional update handling in column stores"—Proceeding SIGMOD '10 Proceedings of the 2010 ACM SIGMOD International Conference on Management of data—Jun. 6-11, 2010—pp. 543-554.*

* cited by examiner

DATA AVAILABILITY DURING COLUMNAR TABLE MERGES

TECHNICAL FIELD

The subject matter described herein relates to enabling approximately uninterrupted access to data stored within a relational database during a merge of data in a delta part and a main part of a table in the relational database.

BACKGROUND

Some databases store data in columnar data tables for improved compression of stored data. For example, some approaches to in-memory database architectures rely upon column stores. To optimally compress new data written to columnar data tables, a database management system associated with such a database typically executes a merge process to merge newer data, which are typically temporarily stored in a delta part of a table with previously stored data, which are retained in a main part of the table. Such a merge process can require a significant amount of time due to reorganization of the columnar table that typically during the merge process. Because access to the data of the columnar data tables is restricted during a merge process, responsiveness to queries or other access requests, such as for example those formed using a data manipulation language (DML), a data query language (DQL), or the like can be delayed, sometimes for an extended period of time depending on the size of the delta part and main parts being merged.

SUMMARY

To address the aforementioned issues and/or to provide one or more other benefits, implementations of the current subject matter can improve access times to data in columnar tables (optionally those of an in-memory relational database) during a merging of data between a delta part and a main part of the table. In one aspect, availability of access to data in a columnar table can be improved through use of additional delta and main parts of the table, for example a second delta part and a shadow second delta part. The second delta part can be used to write any data manipulations occurring during the merge operation while any uncommitted rows in the first delta part are copied to the shadow second delta part. The second delta part and the shadow second delta part are linked to form a new delta for use after the merge is completed.

Computer program products are also described that comprise non-transitory computer readable media storing instructions, which when executed by at least one data processors of one or more computing systems, cause at least one data processor to perform operations described herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The details of one or more variations of the subject matter described herein are set forth in the accompanying drawings and the description below. While certain descriptions and examples discussed in this document reference in-memory databases and features thereof, it will be understood that one or more advantages of the current subject matter may also be realized with relational databases that are not implemented in-memory or that use only some features consistent with a fully in-memory relational database architecture. Other features and advantages of the subject matter described herein will be apparent from the description, the drawings, and the claims.

DESCRIPTION OF DRAWINGS

Like reference symbols in the various drawings indicate like elements.

DETAILED DESCRIPTION

Implementations of the current subject matter can include an improved approach to handling of a merge of delta data held in a delta part of a table and existing data held in a main part of the table.

Figure 1:
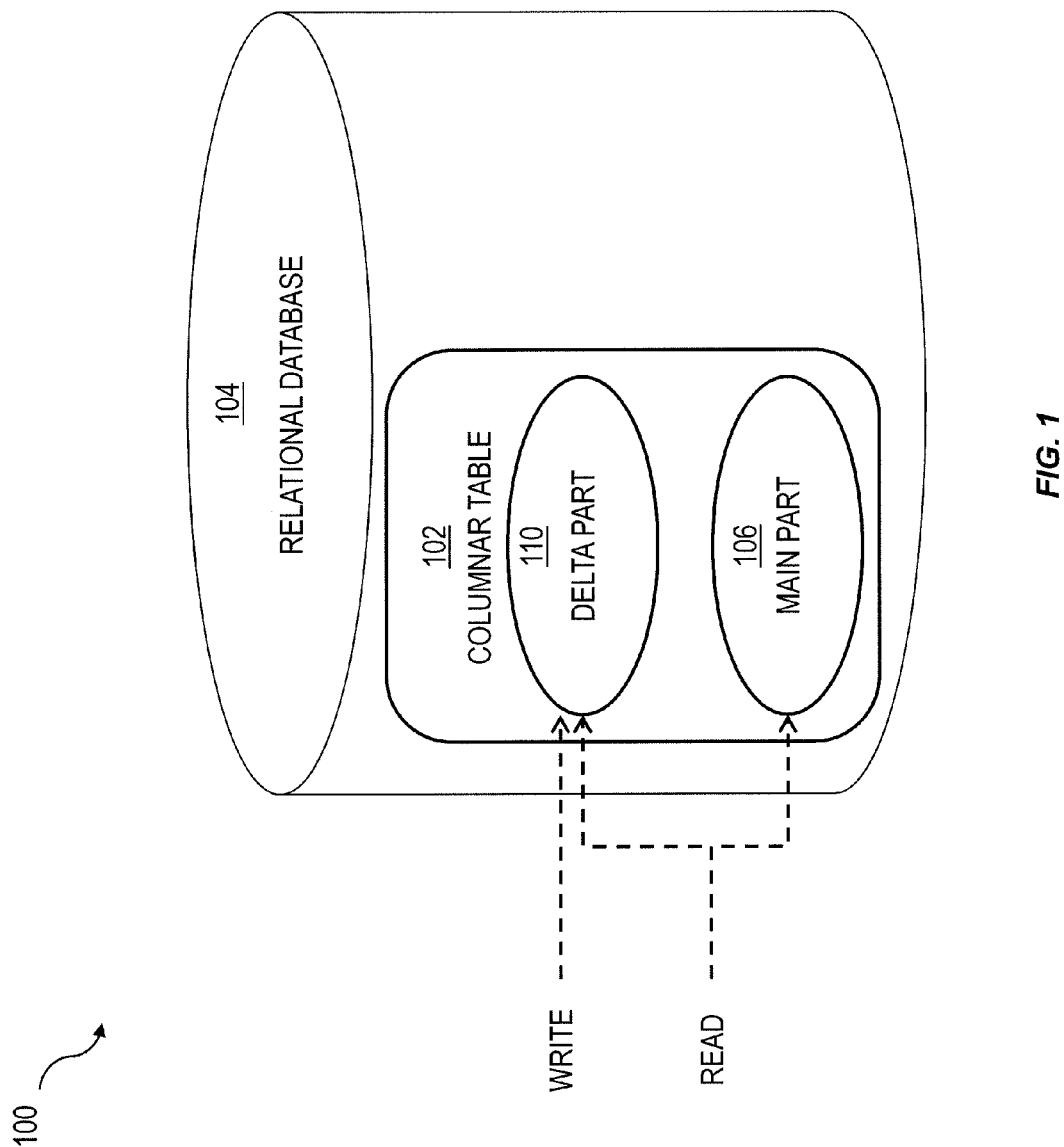
FIG. 1 and FIG. 2 show diagrams illustrating columnar table components for use during a merge operation.

As noted above, a columnar data table 102 in a relational database 104 is typically composed of a main part 106 and a delta part 110. FIG. 1 illustrates a diagram 100 showing features of such a columnar table 102, which includes a main part 106 and a delta part 110. The main part 106 stores read-only data and can be optimized for high compression and read performance. The delta part 110 stores delta data, which can include differences between a state of the data in the main part and a "current" state of one or more records resulting from changes, updates, insertions, etc. occurring via transactions, etc. Affecting the columnar data. The delta part 110 is optimized for a high rate of insertion and writing of data. Periodically, for example when the delta part 110 reaches a threshold size, after a certain preset period of time, or according to one or more other criteria, committed rows in the delta part 110 are merged into the main part 106 such that new or changed data can be optimally compressed. Committed rows refer to rows for which one or more tentative changes are made permanent, such as for example at the completion of a transaction. A merge operation can potentially require a significant period of time to complete, in particular for large columnar tables, for example because the columnar table 102 can require reorganization to achieve the optimized compression. Two exclusionary phases typically occur during such a merge: one and the beginning of the merge operation and one at the end, for example for copying of multi-version concurrency control (MVCC) information. During these exclusionary phases the columnar table 102 can be unavailable for either read or write access. During the remainder of the merge operation, transactions affecting either of the main part 106 or the delta part 110 can proceed consistent with checks of a current lock status.

Figure 2:
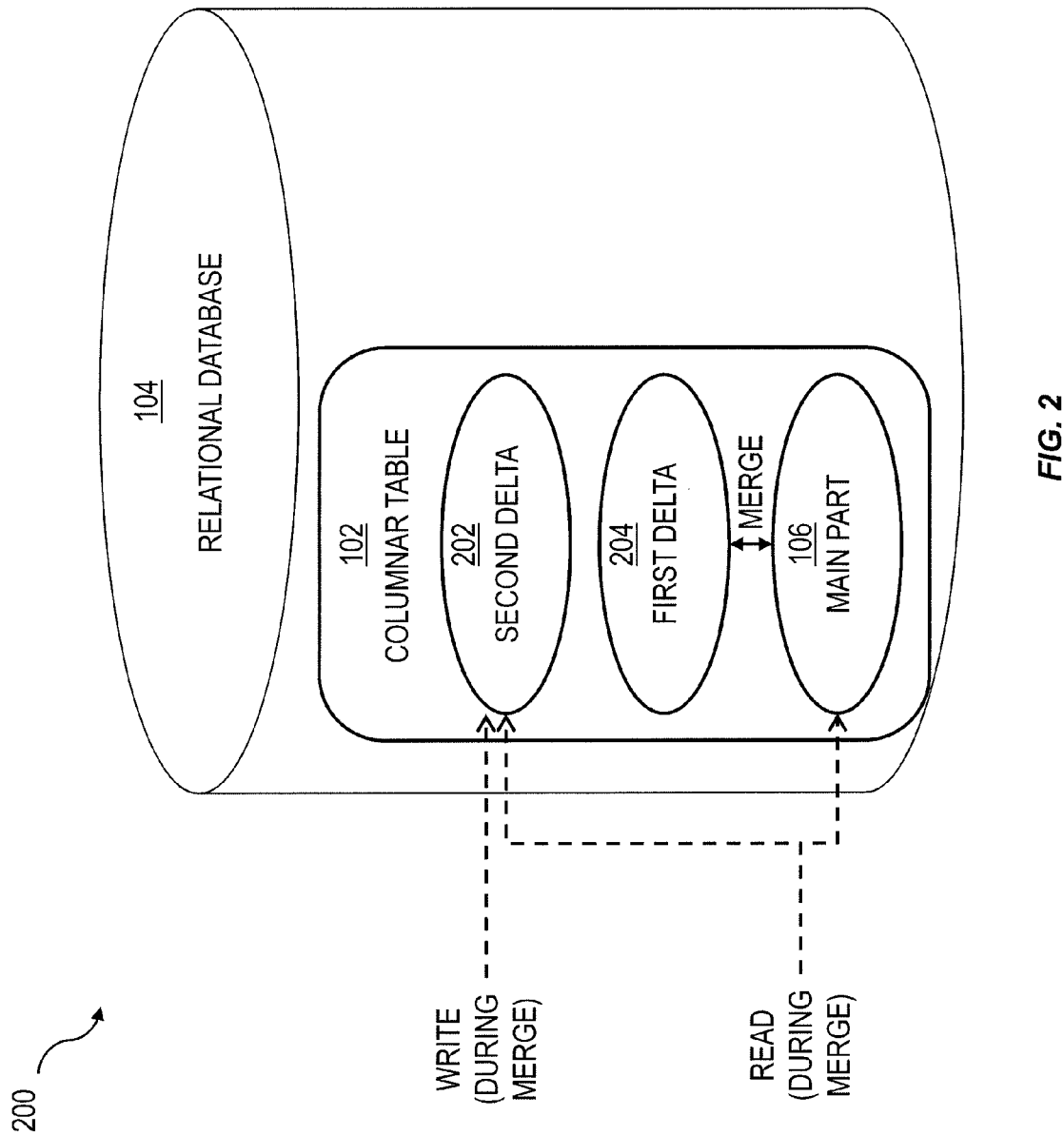

One approach to reducing the period of unavailability of a table 102 undergoing a merge operation includes opening a second delta part 202 as illustrated in the diagram 200 of FIG. 2 such that data manipulation processes (e.g. DML operations or the like) operating on the table 102 do not "starve" during the merge operation. Starvation refers to denial to a process of resources necessary for the process to finish its task. The second delta part 202 can receive and write data changes, updates, insertions, etc. caused by transactions occurring during the period when a merge operation of a first delta part 204 with the main part 106 is in progress.

Opening of the second delta part 202 can include identifying uncommitted rows in the first delta part 204 and copying those uncommitted rows to the second delta part 202. During this copying phase, data manipulation processes (e.g. DML operations or the like) can be disallowed. In some cases, the copying of uncommitted rows from the first delta part 204 to the second delta part 202 can take a long time, especially when long-running transactions are involved. Implementations of the current subject matter can provide significant improvements by eliminating the need for this exclusive lock at the start of the merge operation.

Figure 3:
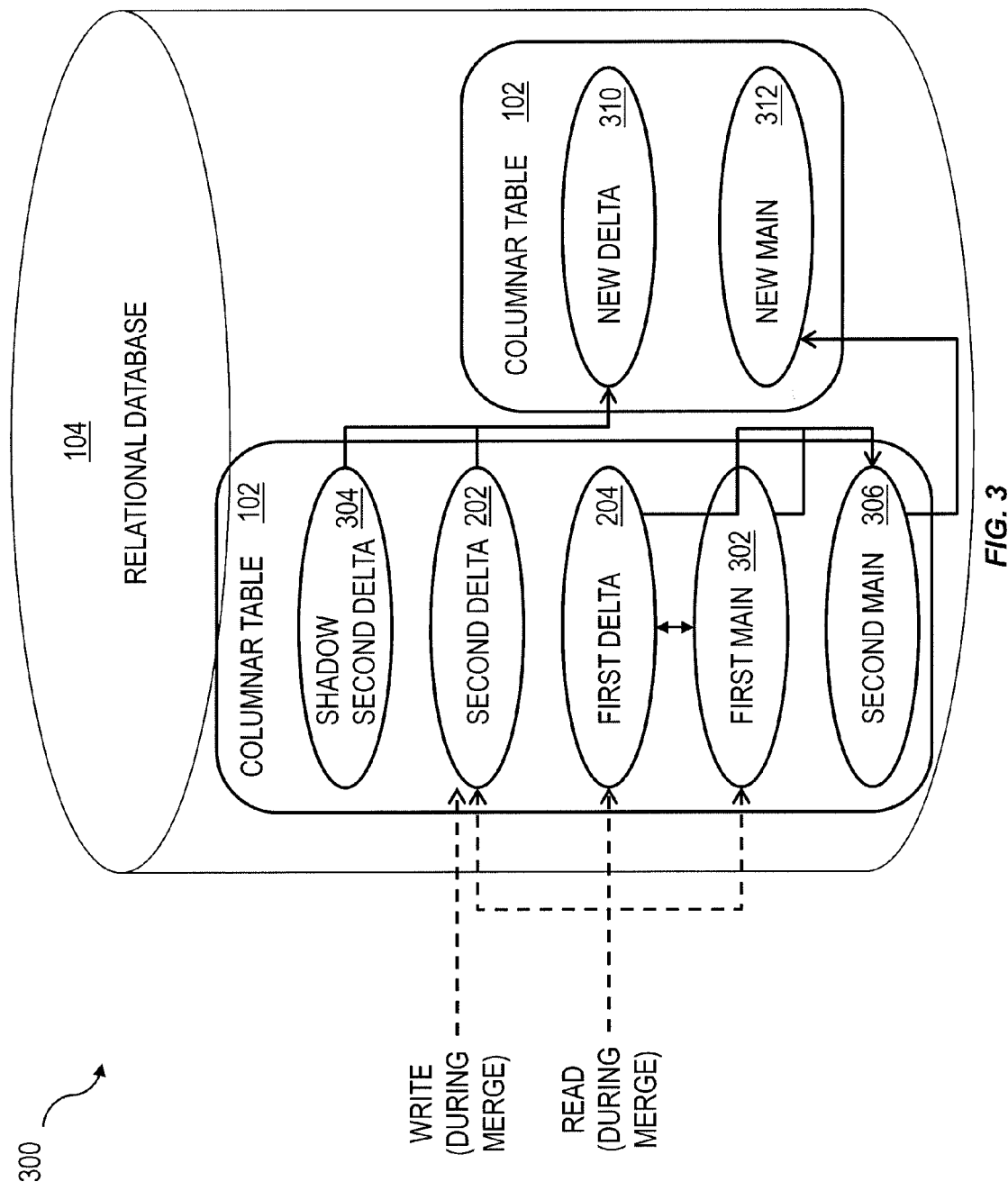
FIG. 3 shows a diagram illustrating additional columnar table components for use during a merge operation.

The diagram 300 of FIG. 3 illustrates additional parts that can be added to a columnar table 102 consistent with implementations of the current subject matter components to reduce or even eliminate interruptions in availability of the data in the columnar table 102 during a merge operation between a first delta part 204 and a first main part 302. A second delta part 202, a shadow second delta part 304, and a second main part 306 can be employed as discussed in greater detail below. Consistent with one or more implementations of the current subject matter, the first main part 302, the first delta part 204, the second delta part 202, the shadow second delta part 304, and the second main part 306 are lock-free structures. As used herein, the term lock-free refers to a shared data structure whose operations do not require mutual exclusion. In other words, if one process is interrupted in the middle of an operation, other processes will not be prevented from operating on that object. In systems that experience a high degree of access concurrency (e.g. as occurs when multiple processes, routines, applications, data structures, or the like may need to concurrently access a table), lock-free data structures can mitigate or even avoid common problems associated with conventional locking techniques, including priority inversion, convoying, and difficulty of avoiding deadlock. Lock free structures can be leveraged to implement a merge operation between the first delta part 204 and the main part 302 as a sequence of atomic operations. Atomic operations refer to operations that will always be executed without any other process being able to read or change state that is read or changed during the operation. Such operations are effectively executed as a single step.

In preparation for a merge operation, a second delta part 202 can be opened to support DML (e.g. data manipulation) operations and the like during the merge of the first delta part 204 and the first main part 302. A shadow second delta part can be opened to support copying from the current (first) delta part 204. A second main part 306 can also be opened. Activation of the second delta part 202 to receive results of DML transactions can occur atomically. Uncommitted rows in the current (first) delta part 204 can be identified for copying to the second delta part 202. Once the second delta part is activated, DML transactions are written to the second delta data part 202 while query access (reads), such as for example those occurring via DQL transactions, make use of the first delta part 204, the second delta part 202, and the first main part 302.

Uncommitted rows from the first delta part 204 can be copied to the shadow second delta part 304 using dictionaries for the second delta part 202. In other words, the shadow second delta part 304 does not have its own dictionary. As used herein, dictionaries refer to a listing or other description of data in a table or other data unit with redundancies removed. In other words, a dictionary of a table having three duplicate entries with the rest of the entries being unique would have two fewer entries than the table itself. New or modified information can be automatically provided for all the system components. This ensures data integrity, data consistency and data security. Corresponding objects (e.g. tables or views, etc.) can be created in an underlying relational database using the data definitions in a dictionary, which describes the logical structure of the objects used in application development and shows how they are mapped to the underlying relational database in tables, views, etc.

Multi-version concurrency control information for rows in the shadow second delta part 304 can be initially set to indicate that such rows are in-process by the merge transaction. In other words, a merge flag can be set for these rows. MVCC databases update an item of data by marking the old data as obsolete and adding a newer version of that data rather than overwriting the old data with new data. Thus, multiple versions of a data record are stored, but only one is the latest, which allows a data access to view all data that occurred when a read of the data began reading, even if some or all of the data being read were modified or deleted part way through the read by another process. A merge operation as discussed herein can perform a merge of the first delta part 204 and the first main part 302 by copying not yet deleted rows from the first main part 302 to the second main part 306 and also adding committed rows from the first delta part 204 to the second main part 306 to form the new main part 312.

After the copying of uncommitted rows from the first delta part 204 to the second delta part 202 is finished, a switch to a new version of the active columnar table components can occur. This switch can include a number of operations, all of which are completed atomically (e.g. as a single unit). The switch operations include activating the completed second delta part 202. Also, data and MVCC information page chains from the second (new) delta part 202 are linked to the end of page chains of the shadow second delta part 304. Additionally, dictionaries of the second delta part 204 are linked to the shadow second delta part 304, and the linked second delta part 202 and shadow second delta part 304 are set as the new delta part 310. The second main part 304 is set as the new main part 312. The new delta part 310 is activated while the first delta part 204, the second delta part 202, and the first main part are all deactivated and scheduled for deletion. Readers can still access the data in these scheduled for deletion parts. For example, copied MVCC information still can read the "deleted" old delta.

MVCC information for uncommitted rows moved from the old (first delta to new delta part 310 are copied. New delta Row create time stamps and delete time stamps (CTS and DTS) for the new delta part 310 are set to the value of the row CTS and DTS in the first delta part 204. In general, CTS and DTS can be additional fields (e.g. columns, etc.) in a table, which indicate a date and time of creation of the row and later deletion of the row. Using MVCC, rows that have been changed are not removed, but are instead labeled with a DTS to indicate the time at which the old version of the row was made inactive. A replacement row with updated data is inserted and marked with a CTS to indicate the time at which the new version of the row was made active. A change of row CTS and DTS in the first delta part 204 to the merge flag (if the value did not change in the meantime) is attempted atomically. If this attempt fails, it is retried.

One or more race conditions can arise in association with implementation of an approach as discussed herein. A race condition refers to separate computer processes or threads of execution depending on some shared state such that an end result depends, somewhat unpredictably, upon which process completes first.

One example of a possible race condition includes an operation (DELETE, UNDO, or visibility check) encountering a merge flag in the MVCC information. This can occur, for example, when MVCC information of the shadow second delta part 304 and the new main part 312 is being accessed before MVCC copying is finished. In such an instance, the operation will retry with MVCC information of the old (first) delta part 204 and the old (first) main part 302. Again, this information can be changed in the meantime by the merge. If the retry fails, this operation can be retried yet again on MVCC information of the new delta part 310 and new main part 312. Alternatively, this operation can wait until the MVCC copy operation finishes, although waiting in this manner can require synchronization, such as for example via an event semaphore or the like.

An operation (DELETE, UNDO, or visibility check) can also encounter a merge flag in the MVCC information if MVCC information of the old (first) delta part 204 or old (first) main part 306 is accessed after this MVCC information is copied to the new delta part 310. In such a case, the operation can be simply retried with a new table reader to determine table fragments (e.g. on a new MVCC information in a new (shadow second) delta part 304 and new main part 312). Alternatively, similar to the above, the single operation can be retried on the MVCC information in the new delta part 310 and new main part 312, which must succeed. The above-mentioned order of MVCC assignments can guarantee that the retry will succeed.

Another example of a possible race condition includes an INSERT operation starting before activation of the new delta part 310, but finishing after the new delta part 310 is activated. That is the INSERT operation works on the old (first) delta part 204 and the old (first) delta part 204 is scheduled for delete at insert finish time. In this case, the operation can be retried on the new delta part 310. It is possible for MVCC information and/or data to have already been copied, in which case reserved row IDs can be reused directly and overwritten with inserted data.

Still another example of a possible race condition includes an UPDATE operation, which can be a composition of INSERT and DELETE operations. To avoid race conditions, an UPDATE operation is decomposed into INSERT and DELETE. A solution to avoid race conditions for INSERT and DELETE operations generally exists, so specific treatment is not required in the current subject matter to avoid race conditions in UPDATE operations.

Mapping of a row index of the new delta part 310 to the old (first) delta part 204 can be maintained throughout the merge operation, since it can be necessary to map uncommitted row indices in the new delta part 310 to row indices in the old (first) delta part 204 for copying purposes. The above lookups can be completed with computational costs O(1). Also, the operations can be guaranteed to complete with at most one additional MVCC lookup in the old/new delta/main parts.

Implementations of the current subject matter can provide one or more of many advantages. For example, continuous or near continuous read and write access to a columnar table of a relational database can be provided even during a merge process of data in a delta part and a main part of the columnar table. Blocking or other restrictions of both DML and DQL operations and potentially other operations by delta copying at merge time can be avoided. By using versioned, lock-free structures, DML and DQL operations need not acquire any technical locks. In this manner, for example, apparent system performance and maximal latency for data access requests for data stored in the columnar table can be significantly improved. These improvements may be particularly beneficial for performance of online transactional processing (OLTP) operations.

Figure 4:
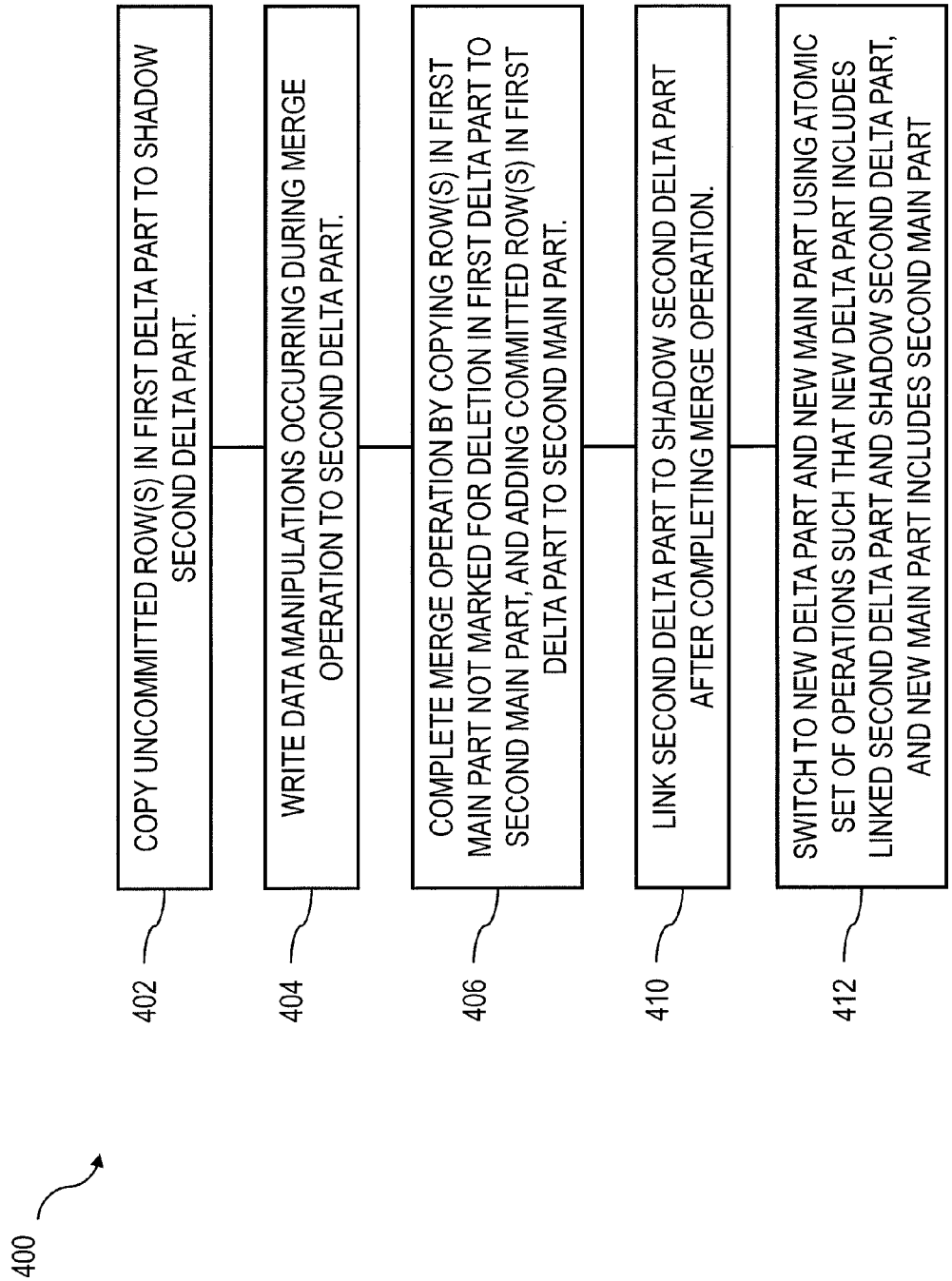
FIG. 4 shows a process flow diagram illustrating features of a method consistent with implementations of the current subject matter.

FIG. 4 shows a process flow chart 400 illustrating features that can be included in a method consistent with one or more implementations of the current subject matter. At 402, as part of a merge operation of a first delta part and a first main part of a columnar table any uncommitted rows in the first delta part are copied to a shadow second delta part. The shadow second delta part 304, as well as a second delta part 202 and a second main part 306, can all be generated as part of a preparation process for a merge operation. Each can be generated in an empty state.

At 404, any data manipulations occurring during the merge operation are written to the second delta part. At 406 the merge operation of the first delta part 204 and the first main part 302 is completed copying, to the second main part 306, any row in the first main part 302 not marked for deletion in the first delta part 204, and adding, to the second main part 306, any committed row in the first delta part 204.

At 410, the second delta part 202 is linked to the shadow second delta part 304 after completion of the merge operation. The linking can include linking of data and MVCC information page chains from the second delta part 202 to the end of page chains of the shadow second data part 304. The linking can also include linking of dictionaries of the second delta part 202 to the shadow second delta part 304.

At 412, a switch to a new delta part 310 and a new main part 312 can be completed atomically, in other words, using an atomic set of operations that succeed or fail as a unit. The switch includes setting the shadow second delta part 304 as the new delta part 310 and the second main part 306 as the new main part 312. Also included are activating the new delta part 310 and new main part 306; deactivating the first delta part 204, the second delta part 202, and the first main part 302; and marking the first delta part 204, the second delta part 202, and the first main part 302 for deletion.

MVCC information for uncommitted rows copied from the first delta part 204 to the shadow second delta part 304 can be copied to the new delta part 310.

Figure 5:
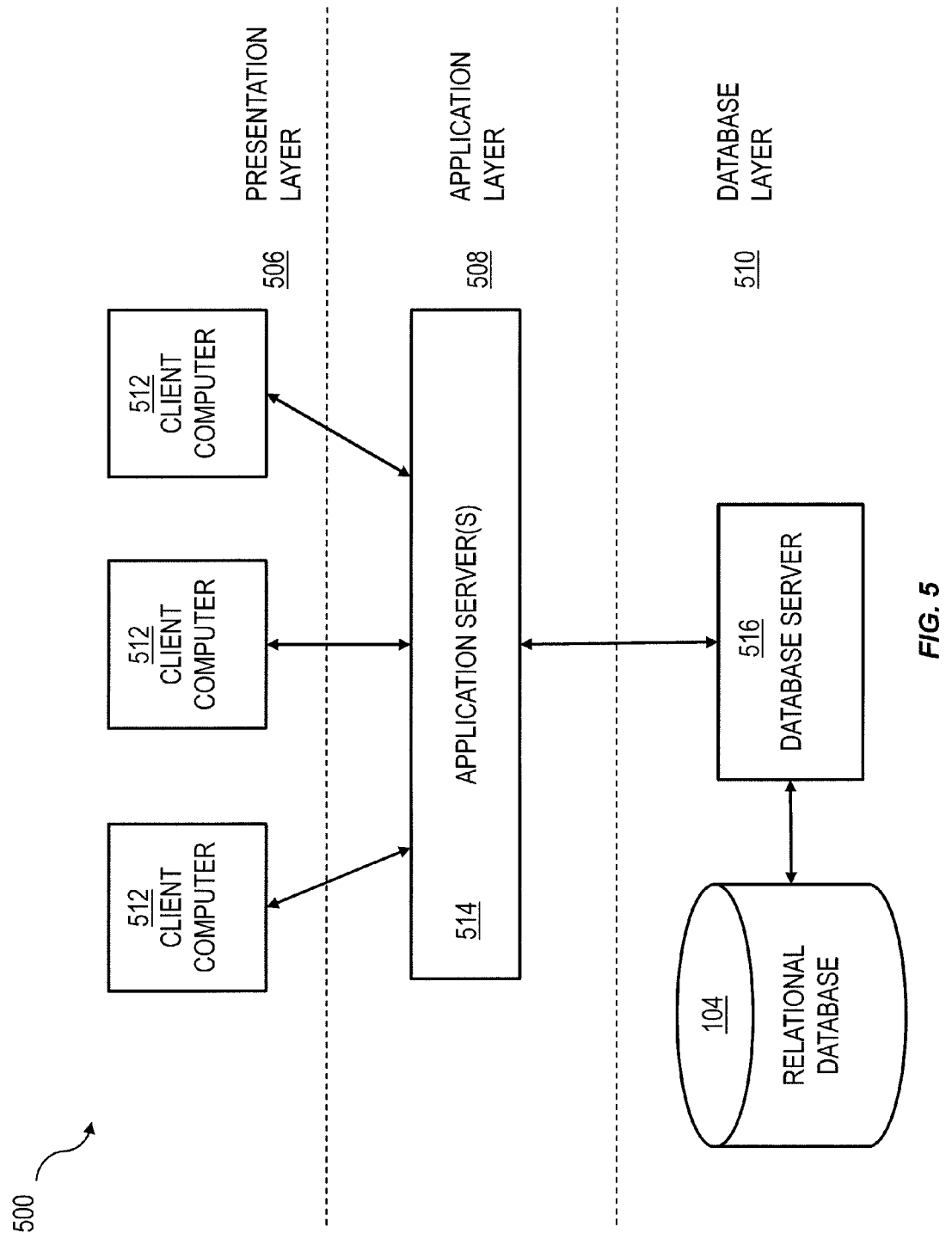
FIG. 5 shows a system diagram illustrating a distributed computing network including an in-memory relational database.

FIG. 5 shows a diagram illustrating features of a distributed computing network 500 including a relational database 104, which can in some examples be an in-memory relational database. One or more features of the distributed computing network 500 can be used in conjunction with implementations of the current subject matter. Components such as those illustrated in FIG. 5 can be arranged in a multi-layered architecture, which can include a presentation layer 506, an application layer 508, and a database layer 510. The components in the presentation layer 506 include can one or more client computers 512 that execute a distributed software application, such as an enterprise resource planning application. The components in the application layer 508 can include one or more application servers that are connected to the client computers 512. The components in the database layer 510 can include the relational database 104 and a database server 516 connected to the one or more application servers 514 and providing access to the relational database 104. Communication between the various components can occur over one or more communication networks. The relational database 104 and database server 516 can, in some implementations of the current subject matter, comprise part of a database management computing system that relies on a main memory of the database management computing system for computer data storage rather than relying on a disk storage associated with the database management computing system. The resultant in-memory database 104 can be significantly faster than a disk-optimized database, for example due to internal optimization algorithms executed by the in-memory relational database 104 being simpler and requiring execution of fewer central processing unit (CPU) instructions. In this example and in others consistent with the current subject matter, the relational database 104 stores data in columnar tables.

Various implementations of the subject matter described herein can be realized/implemented in digital electronic circuitry, integrated circuitry, specially designed application specific integrated circuits (ASICs), computer hardware, firmware, software, and/or combinations thereof. These various implementations can be implemented in one or more computer programs. These computer programs can be executable and/or interpreted on a programmable system. The programmable system can include at least one programmable processor, which can be have a special purpose or a general purpose. The at least one programmable processor can be coupled to a storage system, at least one input device, and at least one output device. The at least one programmable processor can receive data and instructions from, and can transmit data and instructions to, the storage system, the at least one input device, and the at least one output device.

These computer programs (also known as programs, software, software applications or code) can include machine instructions for a programmable processor, and can be implemented in a high-level procedural and/or object-oriented programming language, and/or in assembly/machine language. As can be used herein, the term "machine-readable medium" can refer to any computer program product, apparatus and/or device (for example, magnetic discs, optical disks, memory, programmable logic devices (PLDs)) used to provide machine instructions and/or data to a programmable processor, including a machine-readable medium that can receive machine instructions as a machine-readable signal. The term "machine-readable signal" can refer to any signal used to provide machine instructions and/or data to a programmable processor.

To provide for interaction with a user, the subject matter described herein can be implemented on a computer that can display data to one or more users on a display device, such as a cathode ray tube (CRT) device, a liquid crystal display (LCD) monitor, a light emitting diode (LED) monitor, or any other display device. The computer can receive data from the one or more users via a keyboard, a mouse, a trackball, a joystick, or any other input device. To provide for interaction with the user, other devices can also be provided, such as devices operating based on user feedback, which can include sensory feedback, such as visual feedback, auditory feedback, tactile feedback, and any other feedback. The input from the user can be received in any form, such as acoustic input, speech input, tactile input, or any other input.

The subject matter described herein can be implemented in a computing system that can include at least one of a back-end component, a middleware component, a front-end component, and one or more combinations thereof. The back-end component can be a data server. The middleware component can be an application server. The front-end component can be a client computer having a graphical user interface or a web browser, through which a user can interact with an implementation of the subject matter described herein. The components of the system can be interconnected by any form or medium of digital data communication, such as a communication network. Examples of communication networks can include a local area network, a wide area network, internet, intranet, Bluetooth network, infrared network, or other networks.

The computing system can include clients and servers. A client and server can be generally remote from each other and can interact through a communication network. The relationship of client and server can arise by virtue of computer programs running on the respective computers and having a client-server relationship with each other.

Although a few variations have been described in detail above, other modifications can be possible. For example, the logic flows depicted in the accompanying figures and described herein do not require the particular order shown, or sequential order, to achieve desirable results. Other embodiments may be within the scope of the following claims.

What is claimed is:

1. A computer program product comprising a non-transitory machine-readable medium storing instructions that, when executed by at least one computing system comprising at least one programmable processor, cause the at least one system to perform operations comprising:
    copying, to a shadow second delta part of a columnar table as part of a merge operation of a first delta part and a first main part of the columnar table, any uncommitted rows in the first delta part;
    writing, to a second delta part of the columnar table, any data manipulations occurring during the merge operation;
    completing the merge operation, the completing comprising copying, to a second main part of the columnar table, any row in the first main part not marked for deletion in the first delta part, and adding, to the second main part, any committed row in the first delta part;
    linking the second delta part to the shadow second delta part after completing the merge operation; and
    switching to a new delta part and a new main part using an atomic set of operations, the new delta part comprising the linked second delta part and shadow second delta part, and the new main part comprising the second main part.

2. A computer program product as in claim 1, wherein the operations further comprise: generating the second delta part, the second shadow delta part, and the second main part upon initiation of the merge operation.

3. A computer program product as in claim 1, wherein the operations further comprise: initially setting multi-version concurrency control information for a row in the shadow second delta part to indicate that the row is in-process by the merge operation.

4. A computer program product as in claim 1, wherein the operations further comprise: responding to data read requests occurring during the merge operation using the first delta part, the second delta part, and the first main part.

5. A computer program product as in claim 1, wherein the atomic set of operations comprise:
    activating the new current delta part and the new main part;
    deactivating the first delta part, the first main part, and the second delta part, the deactivating occurring atomically; and
    marking the first delta part, the first main part, and the second delta part for deletion.

6. A computer program product as in claim 1, wherein the operations further comprise: copying, to the new delta part, multi-version concurrency control information for the uncommitted rows copied from the first delta part to the new delta part.

7. A system comprising:
    computer hardware configured to perform operations comprising:

copying, to a shadow second delta part of a columnar table as part of a merge operation of a first delta part and a first main part of the columnar table, any uncommitted rows in the first delta part;

writing, to a second delta part of the columnar table, any data manipulations occurring during the merge operation;

completing the merge operation, the completing comprising copying, to a second main part of the columnar table, any row in the first main part not marked for deletion in the first delta part, and adding, to the second main part, any committed row in the first delta part;

linking the second delta part to the shadow second delta part after completing the merge operation; and switching to a new delta part and a new main part using an atomic set of operations, the new delta part comprising the linked second delta part and shadow second delta part, and the new main part comprising the second main part.

8. A system as in claim 7, wherein the operations further comprise: generating the second delta part, the second shadow delta part, and the second main part upon initiation of the merge operation.

9. A system as in claim 7, wherein the operations further comprise: initially setting multi-version concurrency control information for a row in the shadow second delta part to indicate that the row is in-process by the merge operation.

10. A system as in claim 7, wherein the operations further comprise: responding to data read requests occurring during the merge operation using the first delta part, the second delta part, and the first main part.

11. A system as in claim 7, wherein the atomic set of operations comprise:
activating the new current delta part and the new main part;
deactivating the first delta part, the first main part, and the second delta part, the deactivating occurring atomically; and
marking the first delta part, the first main part, and the second delta part for deletion.

12. A system as in claim 7, wherein the operations further comprise: copying, to the new delta part, multi-version concurrency control information for the uncommitted rows copied from the first delta part to the new delta part.

13. A computer-implemented method comprising:
copying, to a shadow second delta part of a columnar table as part of a merge operation of a first delta part and a first main part of the columnar table, any uncommitted rows in the first delta part;

writing, to a second delta part of the columnar table, any data manipulations occurring during the merge operation;

completing the merge operation, the completing comprising copying, to a second main part of the columnar table, any row in the first main part not marked for deletion in the first delta part, and adding, to the second main part, any committed row in the first delta part;

linking the second delta part to the shadow second delta part after completing the merge operation; and switching to a new delta part and a new main part using an atomic set of operations, the new delta part comprising the linked second delta part and shadow second delta part, and the new main part comprising the second main part.

14. A computer-implemented method as in claim 13, further comprising: generating the second delta part, the second shadow delta part, and the second main part upon initiation of the merge operation.

15. A computer-implemented method as in claim 13, further comprising: initially setting multi-version concurrency control information for a row in the shadow second delta part to indicate that the row is in-process by the merge operation.

16. A computer-implemented method as in claim 13, further comprising: responding to data read requests occurring during the merge operation using the first delta part, the second delta part, and the first main part.

17. A computer-implemented method as in claim 13, wherein the atomic set of operations comprise:
activating the new current delta part and the new main part;
deactivating the first delta part, the first main part, and the second delta part, the deactivating occurring atomically; and
marking the first delta part, the first main part, and the second delta part for deletion.

18. A computer-implemented method as in claim 13, further comprising: copying, to the new delta part, multi-version concurrency control information for the uncommitted rows copied from the first delta part to the new delta part.

19. A computer-implemented method as in claim 13, wherein at least one of the copying, the writing, the completing, the linking, and the switching is performed by at least one system comprising at least one programmable processor.

\* \* \* \* \*